United States Patent
Demoulin et al.

(10) Patent No.: US 12,186,723 B2
(45) Date of Patent: *Jan. 7, 2025

(54) METHOD FOR PREPARING CAPSULES COMPRISING AT LEAST ONE VOLATILE COMPOUND AND CAPSULES OBTAINED THEREFROM

(71) Applicant: CALYXIA, Bonneuil-sur-Marne (FR)

(72) Inventors: Damien Demoulin, Paris (FR); Ludivine Mousnier, Villebon sur Yvette (FR); Karima Ouhenia, Neuilly Plaisance (FR); Jamie Walters, Paris (FR)

(73) Assignee: CALYXIA, Bonneuil-sur-Marne (FR)

( * ) Notice: Subject to any disclaimer, the term of this patent is extended or adjusted under 35 U.S.C. 154(b) by 689 days.

This patent is subject to a terminal disclaimer.

(21) Appl. No.: 16/496,057

(22) PCT Filed: Mar. 21, 2018

(86) PCT No.: PCT/EP2018/057216
§ 371 (c)(1),
(2) Date: Sep. 20, 2019

(87) PCT Pub. No.: WO2018/172433
PCT Pub. Date: Sep. 27, 2018

(65) Prior Publication Data
US 2021/0113984 A1    Apr. 22, 2021

(30) Foreign Application Priority Data

Mar. 21, 2017 (FR) ........................ 1752332

(51) Int. Cl.
*B01J 13/18*    (2006.01)
*C08F 2/22*    (2006.01)
*C08F 2/50*    (2006.01)

(52) U.S. Cl.
CPC ................ *B01J 13/18* (2013.01); *C08F 2/22* (2013.01); *C08F 2/50* (2013.01)

(58) Field of Classification Search
CPC ... B01J 13/18; B01J 13/14; C08F 2/22; C08F 2/50; C08F 2/48
See application file for complete search history.

(56) References Cited

U.S. PATENT DOCUMENTS

| | | | |
|---|---|---|---|
| 11,234,911 B2 * | 2/2022 | Demoulin | A61Q 19/00 |
| 2007/0172426 A1 * | 7/2007 | Lee | B82Y 25/00 427/2.14 |
| 2008/0233201 A1 | 9/2008 | Royere et al. | |
| 2009/0099024 A1 | 4/2009 | Casana Giner et al. | |
| 2009/0289216 A1 | 11/2009 | Jung et al. | |
| 2012/0076843 A1 | 3/2012 | Jung et al. | |
| 2016/0144329 A1 | 5/2016 | Wesner et al. | |

FOREIGN PATENT DOCUMENTS

| | | |
|---|---|---|
| CN | 101404880 A | 4/2009 |
| CN | 102015092 A | 4/2011 |
| CN | 104755162 A | 7/2015 |
| FR | 2867075 A1 | 9/2005 |
| JP | 2005-503500 A | 2/2005 |
| JP | 2009-531366 A | 9/2009 |
| JP | 2012-529981 A | 11/2012 |
| WO | 2007/072046 A2 | 6/2007 |
| WO | 2007/112933 A1 | 10/2007 |
| WO | 2016/085742 A1 | 11/2015 |
| WO | 2017/016636 A1 | 2/2017 |
| WO | 2017/046360 A1 | 3/2017 |

OTHER PUBLICATIONS

International Search Report and Written Opinion for PCT Application No. PCT/EP2018/057216 issued Jun. 5, 2018.
Rapport De Recherche Préliminaire issued in French Application No. 1752332 dated Nov. 15, 2017.

* cited by examiner

*Primary Examiner* — Jessica M Roswell
(74) *Attorney, Agent, or Firm* — TROUTMAN PEPPER HAMILTON SANDERS LLP

(57) ABSTRACT

The present invention relates to a method for preparing solid microcapsules comprising the following steps:

a) preparation of a composition C1, which is either a composition C1a, comprising a single hydrophobic solid particle, or a composition C1b comprising a plurality of hydrophobic solid particles dispersed in a hydrophilic phase, b) addition under stirring of the composition C1 in a polymeric composition C2 at a temperature $T_b$, whereby an emulsion (E1) is obtained;

c) addition, under stirring, of the emulsion (E1) in a composition C3 at a temperature $T_c$, whereby a double emulsion (E2) is obtained;

d) applying a shear to the emulsion (E2), whereby a double emulsion (E3) is obtained; and e) the polymerization of the composition C2, whereby solid microcapsules dispersed in the composition C3 are obtained.

14 Claims, No Drawings

METHOD FOR PREPARING CAPSULES COMPRISING AT LEAST ONE VOLATILE COMPOUND AND CAPSULES OBTAINED THEREFROM

CROSS-REFERENCE TO RELATED APPLICATIONS

This is a U.S. national phase application under 35 U.S.C. § 371 of International Patent Application No. PCT/EP2018/057216, filed Mar. 21, 2018, and claims benefit of priority to French Patent Application No. 1752332, filed Mar. 21, 2017. The entire contents of these applications are hereby incorporated by reference.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Calyxia and 2) Capsum.

FIELD OF THE INVENTION

The present invention relates to a method for preparing capsules comprising at least one volatile compound. It also relates to the capsules so obtained and compositions containing them.

BACKGROUND

Many highly volatile compounds are often present in the formulated products, especially perfuming compounds which give the formulated products interesting odorous properties.

Because of their volatile nature, these compounds evaporate rapidly from the formulated product that contains them, which limits their interest since the formulated product thus rapidly loses its odorous properties.

In addition, some of these compounds are fragile and likely to be degraded as a result of interactions with their environment by mechanisms such as hydrolysis, thermal denaturation or oxidation, which also restricts the life of the odorous properties of the formulated product.

The encapsulation of volatile compounds represents a very interesting way to limit their evaporation and prevent their degradation, thus increasing the lifetime of the odorous properties of the formulated product.

A large number of capsules have been developed in order to protect and/or isolate active ingredients in the formulated products, and in particular volatile compounds. These capsules result from manufacturing methods such as spray-drying, interfacial polymerization, interfacial precipitation or solvent evaporation among many others. The diffusion time of volatile compounds through the capsule-forming materials made by most of these methods remains very short, resulting in very rapid leakage of the capsules. Thus, the life of the odorous properties of the formulated product that contains them is not significantly longer.

The difficulty of providing a truly effective barrier to the diffusion of volatile compounds means that, to date, there is no capsule with satisfactory protection and retention of the properties of these volatile compounds. In other words, the development of capsules with improved protection and retention properties of the volatile compounds remains a constant objective.

BRIEF SUMMARY OF THE INVENTION

The present invention therefore aims to provide a method for encapsulating volatile, even very volatile, compounds and avoiding the aforementioned drawbacks.

The present invention also aims to provide a double emulsion encapsulation method for obtaining controlled size capsules, in particular smaller than 20 µm, or even 5 µm.

The present invention also aims to provide capsules containing at least one volatile, or even very volatile, compound with excellent retention capacity.

The present invention also aims to provide capsules containing at least one volatile, or even very volatile, compound limiting the diffusion of chemical species capable of degrading said volatile compounds and thus protecting the volatile compounds from degradation.

The present invention also aims to improve the performance of formulated products containing highly volatile compounds by providing capsules providing an effective barrier to their evaporation and protection against degradation.

DETAILED DESCRIPTION

Thus, the present invention relates to a method for preparing solid microcapsules comprising the following steps:
  a) the preparation of a composition C1, which is either a composition C1a, comprising a single hydrophobic solid particle, or a composition C1b comprising a plurality of hydrophobic solid particles dispersed in a hydrophilic phase,
    the hydrophobic solid particle(s) containing one or more lipophilic volatile compounds and one or more hydrophobic materials, said material(s) being solid at room temperature and liquid at a temperature above $T_m$,
  b) the addition, under stirring, of the composition C1 in a polymeric composition C2 at a temperature $T_b$, the compositions C1 and C2 being immiscible with one another,
    the temperature $T_b$ being greater than $T_m$ when the composition C1 is a composition C1a and the temperature $T_b$ being less than $T_m$ when the composition C1 is a composition C1b,
    the composition C2 comprising at least one monomer or polymer, at least one crosslinking agent, and, optionally, at least one (photo)initiator or crosslinking catalyst,
    the viscosity of the composition C2 being between 500 mPa·s and 100 000 mPa·s at 25° C., and preferably being greater than the viscosity of the composition C1,
    whereby an emulsion (E1) comprising drops of composition C1a or C1b dispersed in composition C2 is obtained;
  c) the addition, under stirring, of the emulsion (E1) in a composition C3 at a temperature $T_c$, the compositions C2 and C3 not being miscible with each other, the temperature $T_c$ being greater than $T_m$ when the emulsion (E1) comprises drops of composition C1a dispersed in composition C2 and the temperature $T_c$ being less than $T_m$ when the emulsion (E1) comprises drops of composition C1b dispersed in the composition C2, the viscosity of the composition C3 being between 500 mPa·s and 100 000 mPa·s at 25° C., and preferably being greater than the viscosity of the emulsion (E1), whereby a double emulsion (E2) comprising drops dispersed in the composition C3 is obtained;

d) applying shear to the emulsion (E2) at a temperature $T_d$, the temperature $T_d$ being greater than $T_m$ when the composition C1 of step a) is a composition C1a and the temperature $T_d$ being less than $T_m$ when the composition C1 of step a) is a composition C1b, whereby a double emulsion (E3) is obtained comprising controlled size drops dispersed in the composition C3; and e) the polymerization of the composition C2, whereby solid microcapsules dispersed in the composition C3 are obtained.

The method of the invention thus makes it possible to prepare solid microcapsules comprising a core and a solid envelope completely encapsulating at its periphery the core, whereby the core is a composition C1 comprising at least one hydrophobic solid particle containing one or more volatile lipophilic compounds.

The capsules of the invention have excellent retention capacities of the volatile compounds they contain through several mechanisms that reduce or even eliminate their evaporation:

The core of the capsules contains a material or a mixture of materials in which the volatile compounds are soluble. The volatile compounds thus have a high affinity for this material, which greatly limits their volatile character.

When the core of the capsules contains more than one particle, they are dispersed in a hydrophilic phase in which the solubility of the volatile compounds is negligible. This makes it possible to contain the volatile compounds in the particles and prevents their diffusion towards the outside of the capsules.

The polymer forming the rigid envelope of the capsules advantageously limits the diffusion of the chemical species through this envelope, in particular the diffusion of the volatile compounds towards the outside of the capsules.

The polymer forming the rigid envelope of the capsules also advantageously limits the diffusion (or penetration) of chemical species capable of degrading the volatile compounds through this envelope, thus protecting the volatile compounds from degradation.

The method of the invention consists in producing a double emulsion composed of droplets containing the particles of volatile compounds enveloped in a crosslinkable liquid phase. These double drops are then rendered monodisperse in size before being converted by crosslinking or polymerization in rigid capsules. The preparation involves 5 steps described below in detail.

Step a)

Step a) of the method according to the invention consists in preparing a composition C1 comprising at least one hydrophobic solid particle containing at least one volatile lipophilic compound.

The core of the microcapsules of the invention may be prepared in two different ways depending on whether it is desired that it comprises one or more particles, i.e. according to the nature of C1 (C1a or C1b).

According to one embodiment, when the composition C1 is a composition C1a, step a) comprises a step of heating the hydrophobic material(s) to a temperature above $T_m$, followed by a step of adding the volatile lipophilic compound(s), and a step of mixing the whole at a temperature above $T_m$.

Thus, if only one particle is desired in the core, in order to obtain a composition C1a, the hydrophobic material or the mixture of hydrophobic materials intended to form the particles is heated above $T_m$. The volatile compounds are then added and the mixture so formed is stirred while maintaining the temperature above $T_m$.

According to another embodiment, when the composition C1 is a composition C1b, the step a) further comprises a step of dispersing the composition C1a in a hydrophilic phase, while optionally further comprising at least one dispersing agent and/or at least one gelling agent, followed by a cooling step of the dispersion thus obtained at a temperature below $T_m$, whereby hydrophobic solid particles dispersed in said hydrophilic phase are obtained.

Thus, if several particles are desired in the microcapsule core, the mixture C1a is dispersed in a hydrophilic phase immiscible with C1a, preferably in the presence of at least one dispersing agent and/or at least one gelling agent such as described below. The emulsion obtained is then cooled below $T_m$ in order to make the particles of volatile compounds solid.

Composition C1

The composition C1 according to the invention comprises at least one hydrophobic solid particle, said particle containing at least one volatile lipophilic compound and at least one hydrophobic material, solid at room temperature and liquid at a temperature greater than $T_m$.

According to one embodiment, the composition C1 comprises a single hydrophobic solid particle. This is named C1a.

According to another embodiment, the composition C1 comprises a plurality of hydrophobic solid particles which are then dispersed in a hydrophilic phase. Such a composition is named C1b. The composition C1b therefore corresponds to the dispersion of a composition C1a in a hydrophilic phase.

As indicated above, the hydrophobic solid particle(s) according to the invention contain(s) one or more volatile lipophilic compounds and one or more hydrophobic materials which are solid at room temperature and which are liquid at a temperature greater than $T_m$, Volatile Lipophilic Compound The composition C1 according to the invention comprises at least one volatile lipophilic compound. It may also include a mixture of several volatile compounds.

By "volatile compound" is meant a compound capable of evaporating in less than one hour, at ambient temperature (25° C.) and atmospheric pressure (760 mmHg). A volatile compound according to the invention is therefore liquid at ambient temperature, in particular having a non-zero vapor pressure, at ambient temperature and atmospheric pressure, in particular having a vapor pressure ranging from 0.13 Pa to 40 000 Pa ($10^{-3}$ to 300 mm Hg), and preferably from 1.3 Pa at 13 000 Pa (0.01 to 100 mm Hg), and preferably ranging from 1.3 Pa to 1300 Pa (0.01 to 10 mm Hg). The evaporation rate of a volatile compound according to the invention may be evaluated, in particular, by means of the protocol described in the international application WO2006/013413, and, more particularly, by means of the protocol described below.

15 g of volatile compound to be tested are introduced into a crystallizer (diameter: 7 cm) placed on a balance in a chamber of about 0.3 m³, regulated in temperature (25° C.) and humidity (relative humidity 50%).

The liquid is allowed to evaporate freely, without stirring, with ventilation provided by a fan (PAPST-MOTOREN, reference 8550 N, rotating at 2700 rpm) and arranged in a vertical position above the crystallizer containing the compound, whereby the blades are directed towards the crystallizer at a distance of 20 cm from the bottom of the crystallizer.

The mass of volatile compound remaining in the crystallizer is measured at regular intervals of time.

The evaporation profile of the volatile compound is then obtained by plotting the curve of the amount of product evaporated (in mg/cm$^2$) as a function of time (in min). Then the evaporation rate that corresponds to the tangent at the origin of the curve obtained is calculated. The evaporation rates are expressed in mg of volatile compound evaporated per unit area (cm$^2$) and per unit of time (minutes).

In the context of the present invention, the volatile compounds are lipophilic, which are thus miscible in the hydrophobic material, in particular the waxes/butters and immiscible in the hydrophilic phase, when present, in which the particles are suspended. According to the invention, the volatile lipophilic compound may be a single compound or a mixture comprising any volatile lipophilic compound that may be used within the meaning of the invention.

According to one embodiment, the volatile lipophilic compounds are chosen from perfuming agents, flavonoids, polyunsaturated fatty acids, and mixtures thereof.

According to the invention, the volatile lipophilic compound may be in the form of a mixture. Thus, the volatile lipophilic compound according to the invention may comprise a single perfuming agent (or single perfume) or a mixture of several perfuming agents (or a mixture of several perfumes).

Among the perfuming agents, mention may be made of any type of perfume or fragrance, these terms being used here indifferently. These perfumes or fragrances are well known to those skilled in the art and include, in particular, those mentioned, for example, in S. Arctander, Perfume and Flavor Chemicals (Montclair, NJ, 1969), S. Arctander, Perfume and Flavor Materials of Natural Origin (Elizabeth, NJ, 1960), in the International Fragrance Association's list (IFRA http://www.ifraorg.org/en/ingredients) and in "Flavor and Fragrance Materials," 1991 (Allured Publishing Co. Wheaton, Ill, USA).

The perfumes used in the context of the present invention may include natural products such as extracts, essential oils, absolutes, resinoids, resins, concretes, etc., as well as basic synthetic substances such as hydrocarbons, alcohols, aldehydes, ketones, ethers, acids, esters, acetals, ketals, nitriles, etc., including saturated and unsaturated compounds, aliphatic, alicyclic and heterocyclic compounds.

According to one embodiment, the perfuming agent comprises less than 10% or even less than 7.5%, by weight of compound(s) with a ClogP less than 2.1, relative to the total weight of said perfuming agent. According to one embodiment, the perfuming agent does not comprise a compound with a ClogP less than 2.1.

According to another embodiment, the volatile lipophilic compounds are chosen from organic solvents such as saturated and unsaturated, halogenated and non-halogenated, linear, branched and cyclic aliphatic hydrocarbons; halogenated and non-halogenated aromatic hydrocarbons; alcohols; glycols such as ethylene glycol, propylene glycol and their derivatives; ketones such as acetone, butanone or methyl isobutyl ketone; esters; linear and cyclic, aliphatic and aromatic ethers, such as methyl t-butyl ether or tetrahydrofuran; glycol ethers such as ethylene glycol monomethyl ether, ethylene glycol monoethyl ether, ethylene glycol monoethyl ether acetate, ethylene glycol monobutyl ether, diethylene glycol monomethyl ether, diethylene glycol monobutyl ether, diethylene glycol monobutyl ether acetate, diethylene glycol monoethyl ether, diethylene glycol monophenyl ether, diethylene glycol dimethyl ether, propylene glycol monomethyl ether, dipropylene glycol monomethyl ether, tripropylene glycol monomethyl ether, propylene glycol monomethyl ether acetate, propylene glycol monoethyl ether acetate, and propylene glycol monobutyl ether.

According to another embodiment, the volatile lipophilic compounds are chosen from flame retardants such as brominated compounds, for example decabromodiphenyl ethers, hexabromocyclododecanes, brominated epoxide oligomers; phosphorus compounds, for example alkyl phosphates, aryl phosphates, bisaryl phosphates; short-chain and medium-chain chloroparaffins (containing up to about 25 carbon atoms).

According to one embodiment, the content by weight of volatile compounds is between 50% and 99%, preferably between 70% and 98%, relative to the weight of the composition C1a.

According to one embodiment, when the composition C1 is a composition C1b, the composition C1a represents between 20% and 70% of the weight of C1b. The weight of volatile compounds then represents between 10% and 69.3% of the weight of C1b, preferably between 14% and 68.6%.

According to one embodiment, the core of the capsules (formed by the composition C1a or C1b) represents between 20% and 70% of the weight of the capsules. The weight of volatile compounds thus represents between 10% and 69.3% (preferably between 14% and 68.6%) of the weight of the capsules for capsules whose core is formed by a composition C1a (a single particle), or between 2% and 48.5% (preferably between 2.8% and 48%) of the weight of the capsules for capsules whose core is formed by a composition C1b (dispersion of several particles).

Hydrophobic Material

The hydrophobic particles of the composition C1 according to the invention contain at least one hydrophobic material.

According to one embodiment, said hydrophobic material is a solid compound at room temperature and a liquid compound at a temperature T greater than $T_m$. Preferably, $T_m$ is between 30° C. and 80° C., and preferably between 35° C. and 55° C.

According to one embodiment, the hydrophobic material or materials are chosen from waxes, butters or pasty fatty substances, and mixtures thereof.

Wax(es)

For the purposes of the invention, the term "wax" means a lipophilic compound, solid at room temperature (25° C.), with a reversible solid/liquid state change, having a melting point greater than or equal to 30° C. up to 120° C., preferably 80° C.

The protocol for measuring this melting point is described below.

The waxes that may be used according to the invention may be chosen from waxes, solid and deformable or not at room temperature, of animal, vegetable, mineral or synthetic origin, and mixtures thereof.

In particular, it is possible to use hydrocarbon-based waxes such as beeswax, lanolin wax, and Chinese insect waxes; rice wax, Carnauba wax, Candelilla wax, Ouricurry wax, Alfa wax, cork fiber wax, sugar cane wax, Japanese wax and sumac wax; montan wax, microcrystalline waxes, paraffins and ozokerite; polyethylene waxes, waxes obtained by Fisher-Tropsch synthesis, and waxy copolymers and their esters.

Polyvinyl ether waxes, waxes based on cetyl palmitate, glycerol ester and fatty acid waxes, ethylene copolymer waxes, oxidized polyethylene waxes, ethylene homopolymer waxes, polyethylene, polyether waxes, ethylene/vinyl acetate copolymer waxes and polypropylene waxes, the waxes sold under the names Kahlwax®2039 (INCI name: Candelilla cera) and Kahlwax®6607 (INCI name: *Helianthus annuus* Seed Wax) by the company Kahl Wachsraffinerie, Casid HSA (INCI name: Hydroxystearic Acid) by SACI CFPA, Performa®260 (INCI name: Synthetic wax) and Performa®103 (INCI name: Synthetic wax) by New Phase, and AJK-CE2046 (INCI name: Cetearyl alcohol, dibutyl lauroyl glutamide, dibutylethylhaxanoyl glutamide) by the company Kokyu Alcohol Kogyo.

Mention may also be made of waxes obtained by catalytic hydrogenation of animal or vegetable oils having linear or branched C8-C32 fatty chains.

Among these, may be mentioned hydrogenated jojoba oil, hydrogenated sunflower oil, hydrogenated castor oil, hydrogenated coconut oil and hydrogenated lanolin oil, di-tetrastearate (trimethylol-1,1,1 propane) sold under the name "HEST 2T-4S" by the company HETERENE, di-(1,1,1-trimethylolpropane) tetra-enehenate sold under the name HEST 2T-4B by the company HETERENE.

It is also possible to use waxes obtained by transesterification and hydrogenation of vegetable oils, such as castor oil or olive oil, such as the waxes sold under the names Phytowax ricin 16L64® and 22L73® and Phytowax Olive 18L57 by the company Sophim. Such waxes are described in application FR-A-2792190.

As wax within the meaning of the invention, mention may also be made of hydrocarbons (n-alkanes, branched alkanes, olefins, cyclic alkanes, isoprenoids), ketones (monocetones, β-diketones), secondary alcohols, alkanediols (alkane-1,2-diols, alkane-2,3-diols, alkane-α, ω-diols), acids (alkenoic acid and alkanoic acid), ester waxes (primary alcohol esters and secondary alcohol esters), diester waxes (alkanediol diesters, hydroxyl acid diesters), triesterglycerols, triesters of alkane-1,2-diol, ω-hydroxy acid and of fatty acid, esters of hydroxymalonic acid, fatty acid and alcohol, triesters of hydroxyl acids, fatty acid and fatty alcohol, triesters of fatty acid, hydroxyl acid and diol) and polyester waxes (polyesters of fatty acids). For example, n-octacosan, n-heptacosane, n-hexacosane, n-pentacosan, n-tetracosane, n-tricosane, n-docosan, n-heneicosane and n-eicosane may be mentioned. n-nonadecane, myristyl alcohol, pentadecyl alcohol, cetyl alcohol, palmitoleyl alcohol, heptadecyl alcohol, stearyl alcohol, nonadecyl alcohol, arachidyl alcohol, henicosyl alcohol, behenyl alcohol, erucyl alcohol, lignocyl alcohol, ceryl alcohol, 1-heptacosanol, montanyl alcohol, cluytylic alcohol, 1-octacosanol, 1-nonacosanol, myricylic alcohol, melissyl alcohol, 1-triacontanol and 1-dotriacontanol.

The fatty acids that may be used as waxes in the context of the invention are, for example, cerotic acid, palmitic acid, stearic acid, behenic acid, lignoceric acid, arachidic acid, myristic acid, lauric acid, tridecyclic acid, pentadecyclic acid, margaric acid, nonadecyclic acid, henicosylic acid, tricosylic acid, pentacosylic acid, heptacosylic acid, montanic acid, and nonacosylic acid.

The fatty acid esters which may be used as waxes in the context of the invention are, for example, cetyl palmitate, cetyl octanoate, cetyl laurate, cetyl lactate, cetyl isononanoate, cetyl stearate, stearyl stearate, myristyl stearate, cetyl myristate, isocetyl stearate, glyceryl trimyristate, glyceryl tripalmitate, glyceryl monostearate and glyceryl and cetyl palmitate.

It is also possible to use silicone waxes, which may advantageously be substituted polysiloxanes, preferably at a low melting point.

Among the commercial silicone waxes of this type, mention may be made, in particular, of those sold under the names Abilwax 9800, 9801 or 9810 (GOLDSCHMIDT), KF910 and KF7002 (SHIN ETSU), or 176-1118-3 and 176-11481 (GENERAL ELECTRIC).

The silicone waxes that may be used may also be alkyl or alkoxydimethicones such as the following commercial products: Abilwax 2428, 2434 and 2440 (GOLDSCHMIDT), or VP 1622 and VP 1621 (WACKER), as well as (C20-C60) alkyldimethicones, in particular especially (C30-C45) alkyldimethicones such as the silicone wax sold under the name SF-1642 by the company GE-Bayer Silicones.

It is also possible to use hydrocarbon waxes modified with silicone or fluorinated groups such as, for example, siliconyl candelilla, siliconyl beeswax and Fluorobeeswax by Koster Keunen.

The waxes may also be chosen from fluorinated waxes.

Butter(s) or Pasty Fat

For the purposes of the present invention, the term "butter" (also referred to as "pasty fatty substance") is understood to mean a lipophilic fatty compound with a reversible solid/liquid state change and comprising, at the temperature of 25° C. and at atmospheric pressure (760 mm Hg), a liquid fraction and a solid fraction. In other words, the starting melting temperature of the pasty compound may be less than 25° C. The liquid fraction of the pasty compound measured at 25° C. may represent from 9% to 97% by weight of the compound. This liquid fraction at 25° C. is preferably between 15% and 85%, more preferably between 40% and 85% by weight. Preferably, the one or more butters have an end-of-melting temperature of less than 60° C. Preferably, the one or more butters have a hardness less than or equal to 6 MPa.

Preferably, the butters or pasty fatty substances have an anisotropic crystalline organization in the solid state that is visible by X-ray observations.

For the purposes of the invention, the melting temperature corresponds to the temperature of the most endothermic peak observed in thermal analysis (through DSC) as described in ISO 11357-3; 1999. The melting point of a paste or a wax may be measured using a differential scanning calorimeter (DSC), for example the calorimeter sold under the name "DSC Q2000" by the company TA Instruments.

Concerning the measurement of the melting temperature and the determination of the end-of-melting temperature, the sample preparation and measurement protocols are as follows: A sample of 5 mg of pasty fatty substance (or butter) or wax previously heated to 80° C. and obtained through magnetic stirring using an equally heated spatula is placed in an airtight aluminum capsule or crucible. Two tests are carried out to ensure the reproducibility of the results.

The measurements are carried out on the calorimeter mentioned above. The oven is subjected to a nitrogen sweep. The cooling is ensured by the RCS 90 heat exchanger. The sample is then subjected to the following protocol, first being brought to a temperature of 20° C. and then subjected to a first temperature rise ranging from 20° C. to 80° C. at a heating rate of 5° C./minute, then cooled from 80° C. to −80° C. at a cooling rate of 5° C./minute and finally subjected to a second temperature rise from −80° C. to 80°

C. at a heating rate of 5° C./minute. During the second rise in temperature, the variation of the power difference absorbed by the empty crucible and the crucible containing the butter sample is measured as a function of temperature. The melting point of the compound is the value of the temperature corresponding to the peak apex of the curve representing the variation of the difference in power absorbed as a function of the temperature. The end-of-melting temperature corresponds to the temperature at which 95% of the sample melted.

The liquid fraction by weight of the butter (or pasty fatty substance) at 25° C. is equal to the ratio of the heat consumed at 25° C. relative to the enthalpy of melting of the butter. The enthalpy of melting of the butter or pasty compound is the enthalpy consumed by the compound upon passing from the solid state to the liquid state.

The butter is said to be in the solid state when the entirety of its weight is in crystalline solid form. The butter is said to be in the liquid state when the entirety of its weight is in liquid form. The melting enthalpy of the butter is equal to the integral of the whole of the melting curve obtained with the aid of the calorimeter evoked, with a rise in temperature of 5° C. or 10° C. per minute, according to the standard ISO 11357-3: 1999. The melting enthalpy of the butter is the amount of energy required to pass the compound from the solid state to the liquid state. It is expressed in J/g.

The enthalpy of fusion consumed at 25° C. is the amount of energy absorbed by the sample to change from the solid state to the state it has at 25° C., consisting of a liquid fraction and a solid fraction. The liquid fraction of the butter measured at 32° C. preferably represents from 30% to 100% by weight of the compound, preferably from 50% to 100%, more preferably from 60% to 100% by weight of the compound. When the liquid fraction of the butter measured at 32° C. is 100%, the temperature of the end-of-melting range of the pasty compound is less than or equal to 32° C. The liquid fraction of the butter measured at 32° C. is equal to the ratio of the enthalpy of fusion consumed at 32° C. on the enthalpy of melting of the butter. The enthalpy of melting consumed at 32° C. is calculated in the same way as the enthalpy of melting consumed at 23° C.

For hardness measurement, the sample preparation and measurement protocols are as follows: the butter is placed in a 75 mm diameter mold that is about 75% full. In order to overcome the thermal past and control the crystallization, the mold is placed in the Vôtsch VC0018 programmable oven where it is first heated to 80° C. for 60 minutes, then cooled from 80° C. to 0° C. at a cooling rate of 5° C./minute, then left at the stabilized temperature of 0° C. for 60 minutes, then subjected to a temperature rise from 0° C. to 20° C., at a heating rate of 5° C./minute, then left at the stabilized temperature of 20° C. for 180 minutes. The compression force measurement is performed with a Swantech TA/TX2i texturometer. The probe used is chosen according to the texture: —2 mm diameter cylindrical steel probe for very rigid raw materials; —12 mm diameter cylindrical steel probe for rigid raw materials. The measurement comprises 3 steps: a first step after automatic detection of the surface of the sample where the probe moves at a measuring speed of 0.1 mm/s, and penetrates into the butter at a depth of penetration of 0.3 mm, whereby the software notes the value of the maximum force reached; a second so-called relaxation stage where the probe stays at this position for one second and where the force is noted after 1 second of relaxation; finally a third so-called withdrawal step where the probe returns to its initial position at the speed of 1 mm/s and the energy of withdrawal of the probe (negative force) is recorded.

The value of the hardness measured in the first step corresponds to the maximum compression force measured in Newton divided by the surface area of the texturometer cylinder expressed in $mm^2$ in contact with the butter or emulsion according to the invention. The value of hardness obtained is expressed in mega-pascals or MPa.

The pasty fatty substance or butter may be chosen from synthetic compounds and compounds of plant origin. A pasty fatty substance may be obtained synthetically from starting materials of plant origin.

The pasty fatty substance is advantageously chosen from:
lanolin and its derivatives such as lanolin alcohol, oxyethylenated lanolins, acetylated lanolin, lanolin esters such as isopropyl lanolate, oxypropylenated lanolines,
polymeric or non-polymeric silicone compounds, such as polydimethylsiloxanes of high molecular weight, polydimethylsiloxanes with side chains of the alkyl or alkoxy type having from 8 to 24 carbon atoms, especially stearyl dimethicones,
polymeric or non-polymeric fluorinated compounds,
vinyl polymers, in particular
homopolymers of olefins,
copolymers of olefins,
homopolymers and copolymers of hydrogenated dienes,
linear or branched oligomers, homo or copolymers of alkyl (meth) acrylates, preferably having a $C_8$-$C_{30}$ alkyl group,
homo and copolymeric oligomers of vinyl esters having $C_8$-$C_{30}$ alkyl groups,
homo and copolymer oligomers of vinyl ethers having $C_8$-$C_{30}$ alkyl groups,
the liposoluble polyethers resulting from the polyetherification between one or more $C_2$-$C_{100}$, preferably $C_2$-$C_{50}$, diols,
esters and polyesters, and
their mixtures.

According to a preferred embodiment of the invention, the particular butter(s) is/are of plant origin such as those described in Ullmann's Encyclopedia of Industrial Chemistry ("Fats and Fatty Oils", A. Thomas, published on Jun. 15, 2000, D01: 10.1002/14356007.a10_173, point 13.2.2.2F, Shea Butter, Borneo Tallow, and Related Fats (Vegetable Butters).

More particularly C10-C18 triglycerides (INCI name: C10-18 Triglycerides) comprising at a temperature of 25° C. and atmospheric pressure (760 mm Hg), a liquid fraction and a solid fraction, shea butter, Nilotica Shea butter (*Butyrospermum parkii*), Galam butter (*Butyrospermum parkii*), Borneo butter or fat or Tengkawang tallow) (*Shorea stenoptera*), Shorea butter, Illipé butter, Madhuca butter or Bassia Madhuca longifolia, mowrah butter (*Madhuca latifolia*), Katiau butter (*Madhuca mottleyana*), Phulwara butter (*M. butyracea*), mango butter (*Mangifera indica*), Murumuru butter (*Astrocatyum murumuru*), Kokum butter (*Garcinia indica*), Ucuuba butter (*Virola sebifera*), Tucuma butter, Painya butter (Kpangnan) (*Pentadesma butyracea*), Coffee butter (*Coffea arabica*), Apricot butter (*Prunus armeniaca*), Macadamia butter (*Macadamia temifolia*), butter in grapes (*Vitis vinifera*), avocado butter (*Persea gratissima*), olive butter (*Olea europaea*), sweet almond butter (*Prunus amygdalus dulcis*), cocoa butter (*Theobroma cacao*) and sunflower butter, butter under the INCI name Astrocaryum Murumuru Seed Butter, butter under the INCI name Theobroma Grandiflorum Seed Butter, and butter under the INCI name Irvingia Gabonensis Kernel Butter, jojoba esters (mixture of wax and oil hydrogenated jojoba) (INCI name: Jojoba esters) and ethyl esters of shea butter (INCI name: Shea butter ethyl esters), and mixtures thereof.

According to one embodiment, when the composition C1 is a composition C1a, the content by weight of hydrophobic materials is between 1% and 50%, preferably between 2% and 30%, relative to the composition of the weight C1a.

According to one embodiment, when the composition C1 is a composition C1b, the composition C1a represents between 20% and 70% of the weight of C1b. The content by weight of hydrophobic materials is therefore between 0.2% and 35%, preferably between 0.4% and 21%, relative to the weight of composition C1b.

Hydrophilic Phase

When the composition C1 is a composition C1b, it comprises a hydrophilic phase in which the above-mentioned hydrophobic solid particles are dispersed.

According to one embodiment, the hydrophilic phase of C1b comprises at least one dispersing agent and/or at least one gelling agent.

Preferably, said hydrophilic phase contains between 1% and 10%, preferably between 2% and 6%, by weight of one or more gelling agents and between 1% and 10%, preferably between 1% and 4%, in weight of one or more dispersing agent(s) relative to the weight of said hydrophilic phase.

Dispersing Agent

The aforementioned hydrophilic phase may further comprise at least one dispersing agent, different from the gelling agent below. The dispersing agent is preferably selected from the group consisting of polyacrylates; esters of sugar/polysaccharide and fatty acid(s), in particular esters of dextrin and fatty acid(s), esters of inulin and fatty acid(s) or esters of glycerol and of fatty acid(s); polyamides; polyethers and polyesters of silicone; ethoxylated alcohols; and their mixtures.

According to one embodiment, the dispersing agent is a surfactant which may be selected from the group consisting of nonionic surfactants, anionic surfactants, amphoteric or zwitterionic surfactants and mixtures thereof, preferably nonionic surfactants.

As surfactants which may be used in the present invention, mention may be made of those described in application EP 1 764 084.

Preferably, a surfactant that may be used in the present invention is a nonionic surfactant chosen from sorbitan fatty acid esters and their oxyethylenated derivatives, such as sorbitan monostearate (CTFA name: Sorbitan stearate) sold by ICI under the name Span 60, sorbitan monopalmitate (CTFA name: Sorbitan palmitate) sold by ICI under the name Span 40, oxyethylenated sorbitan stearates, palmitates and oleates (CTFA name: Polysorbate) sold by the company ICI under the names Tween, in particular Polysorbate 60 (Tween 60), Polysorbate 65 (Tween 65), Polysorbate 80 (Tween 80).

Gelling Agent

The aforementioned hydrophilic phase may further comprise at least one gelling agent, different from the dispersing agent described above.

The gelling agent contributes to increasing the viscosity of the hydrophilic phase, and therefore of the composition C1b, which advantageously ensures the kinetic stability of the composition C1b, thus preventing the risk of phase shift during the duration of the manufacturing method. Also, the relatively high viscosity of the composition C1b ensures the stability of the emulsion (E1) obtained at the end of step b).

According to one embodiment, the gelling agent is chosen from branched polymers, preferably having a molecular weight greater than 5,000 g/mol, polymers with a molecular weight greater than 5,000 g/mol, and mixtures thereof. These gelling agents are described in more detail below.

According to one embodiment, the gelling agent is a branched polymer, preferably with a molecular weight greater than 5,000 g/mol, preferably between 10,000 g/mol and 500,000 g/mol, for example between 50 000 g·mol$^{-1}$ and 300,000 gmol$^{-1}$.

According to one embodiment, the gelling agent is a polymer with a molecular weight of greater than 5000 g/mol, preferably between 10 000 g/mol and 500 000 g/mol, for example between 50 000 g/mol$^{-1}$ and 300,000 g/mol$^{-1}$.

According to another embodiment, the gelling agent is chosen from cellulose derivatives, polyacrylates, polyurethanes and their derivatives, polyethers and their derivatives, polyacrylamides, polyvinylpyrrolidone (PVP) and its derivatives, polyvinyl alcohol. (PVA) and its derivatives, poly (ethylene glycol), poly (propylene glycol) and their derivatives, polysaccharides, protein derivatives, fatty acid salts, glycerol derivatives, glycoluril derivatives and mixtures thereof. These gelling agents are described in more detail below.

Of course, those skilled in the art will choose hydrophilic or water-soluble gelling agents in view of their implementation in the hydrophilic phase. This selection is general knowledge to those skilled in the art.

According to one embodiment, the hydrophilic phase represents between 30% and 80% by weight relative to the weight of C1b. The core of the capsules represents between 20% and 70% of the weight of the capsules. The hydrophilic phase therefore preferably represents between 6% and 56% of the weight of the capsules.

According to one embodiment, the composition C1b comprises from 30% to 80% by weight of hydrophilic phase and from 20% to 70% by weight of hydrophobic particles relative to the total weight of the composition C1b.

Step b)

Step b) of the method according to the invention consists in preparing a first emulsion (E1).

The first emulsion consists of a dispersion of droplets of the composition C1a (respectively C1b) in a C2 immiscible polymeric composition C1a (respectively C1b), created by dropwise addition of C1a (respectively C1b) in C2 under stirring.

During step b), while taking into account the parameter $T_m$, the composition C1 is at a temperature of between 0° C. and 100° C., preferably between 10° C. and 80° C., and preferably between 15° C. and 60° C. During step b), while taking into account the parameter $T_m$, the composition C2 is at a temperature of between 0° C. and 100° C., preferably between 10° C. and 80° C., and preferably between 15° C. and 60° C.

Under the conditions of addition of step b), the compositions C1 and C2 are not miscible with each other, which means that the amount (by weight) of the composition C1 capable of being solubilized in the composition C2 is less than or equal to 5%, preferably less than 1%, and preferably less than 0.5%, relative to the total weight of composition C2, and that the amount (by weight) of the composition C2 capable of being solubilized in composition C1 is less than or equal to 5%, preferably less than 1%, and preferably less than 0.5%, relative to the total weight of composition C1.

Thus, when the composition C1 comes into contact with the composition C2 under stirring, the latter is dispersed in the form of drops, called single drops.

Composition C2 is stirred to form an emulsion comprising drops of composition C1 dispersed in composition C2. This emulsion is also called "single emulsion" or C1-in-C2 emulsion.

To implement step b), it is possible to use any type of stirrer usually used to form emulsions, such as, for example, a mechanical stirrer, a static emulsifier, an ultrasonic homogenizer, a membrane homogenizer, a high pressure homogenizer, a colloid mill, a high shear disperser or a high speed homogenizer.

The composition C1 is as defined above.

To obtain capsules containing a single particle, one will choose to add C1a in C2 at a temperature higher than $T_m$. In other words, in this embodiment, the core of the drops of the first emulsion is entirely formed of C1a or of a single hydrophobic solid particle.

To obtain capsules containing several particles, one will choose to add C1b in C2 at a temperature below $T_m$.

Composition C2

The composition C2 is intended to form the future solid envelope of the microcapsules.

The volume fraction of C1-in-C2 may vary from 0.1 to 0.7 in order to control the thickness of the envelope of the capsules obtained at the end of the method.

According to one embodiment, the ratio between the volume of composition C1 and the volume of composition C2 varies between 1:10 and 10:1. Preferably, this ratio is between 1:3 and 5:1, preferably between 1:3 and 3:1.

According to this embodiment, the destabilization kinetics of the drops of the emulsion (E1) is significantly slow, which allows the envelope of the microcapsules to be polymerized during step e) before the emulsion is destabilized. The polymerization, once completed, then provides thermodynamic stabilization. Thus, the relatively high viscosity of the composition C2 ensures the stability of the emulsion (E1) obtained at the end of step b).

Preferably, the viscosity of the composition C2 at 25° C. is between 1000 mPa·s and 50,000 mPa·s, preferably between 2000 mPa·s and 25,000 mPa·s, and, for example, between 3000 mPa·s and 15,000 mPa·s.

Preferably, the viscosity of the composition C2 is greater than the viscosity of the composition C1.

The viscosity is measured by means of a Haake Rheostress™ 600 rheometer equipped with a cone of diameter 60 mm and angle 2 degrees, and a temperature control cell set at 25° C. The value of the viscosity is read for a shear rate of $10 \, s^{-1}$.

Preferably, the interfacial tension between compositions C1 and C2 is low. Typically, these interfacial tensions vary between 0 mN/m and 50 mN/m, preferably between 0 mN/m and 20 mN/m.

The low interfacial tension between the compositions C1 and C2 also advantageously makes it possible to ensure the stability of the emulsion (E1) obtained at the end of step b).

The composition C2 contains at least one monomer or polymer, at least one crosslinking agent, and optionally at least one (photo) initiator or crosslinking catalyst, thus making it crosslinkable.

According to one embodiment, the composition C2 comprises from 50% to 99% by weight of monomer or polymer, or a mixture of monomers or polymers, relative to the total weight of the composition C2.

According to one embodiment, the composition C2 comprises from 1% to 20% by weight of crosslinking agent or of a mixture of crosslinking agents, relative to the total weight of the composition C2.

According to one embodiment, the composition C2 comprises from 0.1% to 5% by weight of photoinitiator or a mixture of photoinitiators, relative to the total weight of the composition C2.

According to one embodiment, the composition C2 comprises from 0.001% to 70% by weight of crosslinking agent relative to the weight of said composition C2.

According to the invention, the term "monomer" or "polymer" denotes any base unit suitable for the formation of a solid material by polymerization, either alone or in combination with other monomers or polymers.

These monomers may be chosen from monomers comprising at least one reactive functional group chosen from the group consisting of acrylate, methacrylate, vinyl ether, N-vinyl ether, mercaptoester, thiolene, siloxane, epoxy, oxetane, urethane, isocyanate and peroxide functions.

In particular, the monomers may be chosen from monomers bearing at least one of the aforementioned reactive functional groups and additionally bearing at least one functional group selected from the group consisting of primary, secondary and tertiary alkylamine functions, quaternary amine functional groups, sulfate functions, sulfonate, phoshate, phosphonate, carboxylate, hydroxyl, halogen, and mixtures thereof.

The polymers used in the composition C2 may be chosen from polyethers, polyesters, polyurethanes, polyureas, polyethylene glycols, polypropylene glycols, polyamides, polyacetals, polyimides, polyolefins, polysulphides and polydimethylsiloxanes, said polymers additionally bearing at least one reactive function chosen. in the group consisting of acrylate, methacrylate, vinyl ether, N-vinyl ether, mercaptoester, thiolene, siloxane, epoxy, oxetane, urethane, isocyanate and peroxide functions.

Examples of such polymers include, but are not limited to, the following polymers: poly(2-(1-naphthyloxy) ethyl acrylate), poly(2-(2-naphthyloxy) ethyl acrylate), poly(2-(2-naphthyloxy) ethyl methacrylate), polysorbitol dimethacrylate, polyacrylamide, poly((2-(1-naphthyloxy) ethanol), poly(2-(2-naphthyloxy) ethanol), poly(1-chloro-2), 3-epoxypropane), poly(n-butyl isocyanate), poly(N-vinyl carbazole), poly(N-vinyl pyrrolidone), poly(p-benzamide), poly(p-chlorostyrene), poly(p-methyl styrene) poly(p-phenylene oxide), poly(p-phenylene sulfide), poly(N-(methacryloxyethyl) succinimide), polybenzimidazole, polybutadiene, polybutylene terephthalate, polychloral, polychlorinated trifluoroethylene, polyether imide, polyether ketone, polyether sulfone, polyhydridosilsesquioxane, poly(m-phenylene isophthalamide), poly(methyl 2-acrylamido-2-methoxyacetate), poly(2-acrylamido-2-methylpropanesulfonic acid), poly-mono-butyl maleate, polybutyl methacrylate, poly(N-tert-butylmethacrylamide), poly(N-butylmethacrylamide), polycyclohexylmethacrylamide, poly(m-xylenebisacrylamide 2,3-dimethyl-1,3-butadiene, N,N-dimethylmethacrylamide), poly(n-butyl methacrylate), poly(cyclohexyl methacrylate), polyisobutyl methacrylate, poly(4-cyclohexylstyrene), polycyclol acrylate, polycyclol methacrylate, polydiethyl ethoxymethylenemalonate, poly(2,2,2-trifluoroethyl methacrylate), poly(1,1,1-trimethylolpropane trimethacrylate) polymethacrylate, poly(N, N-dimethylaniline, dihydrazide), poly(isophthalic dihydrazine), isophthalic polyacid, polydimethyl benzilketal, epichlorohydrin, poly(ethyl-3,3-diethoxyacrylate), poly(ethyl-3,3-dimethylacrylate), poly(ethyl vinyl ketone), poly(vinyl ethyl ketone), poly(penten-3-one), polyformaldehyde poly(diallyl acetal), polyfumaronitrile, polyglyceryl propoxy triacrylate, polyglyceryl trimethacrylate, polyglycidoxypropyltrimethoxysilane, polyglycidyl acrylate, poly(n-heptyl acrylate), poly(n-heptyl acrylic acid ester), poly(n-heptyl methacrylate), poly(3-hydroxypropionitrile), poly(2-hydroxypropyl acrylate), poly(2-hydroxypropyl methacrylate) poly(N-(methacryloxyethyl) phthalimide), poly(1,9-nonanediol diacrylate), poly(1,9-nonanediol dimethacrylate), poly(N-(n-propyl) acrylamide), poly(orthophthalic acid) poly(iso-phthalic acid), poly(1,4-benzenedicarboxylic acid), poly(1,3-benzenedicarboxylic acid), poly(phthalic acid), poly(mono-2-acryloxyethyl ester), terephthalic polyacid, phthalic polyanhydride polyethylene glycol diacrylate, polyethylene glycol methacrylate, polyethylene glycol dimethacrylate, polyisopropyl acrylate, polysorbitol pentaacrylate, polyvinyl bromoacetate, polychloroprene, poly(di-n-hexylsilylene), poly(di-n-propylsiloxane), polydimethylsilylene, polydiphenyl siloxane, polyvinyl propionate, polyvinyl triacetoxysilane, polyvinyl tris-tert-butoxysilane, polyvinyl butyral polyvinyl alcohol, polyvinyl acetate, polyethylene co-vinyl acetate, poly(bisphenol-A polysulfone), poly(1,3-dioxepane), poly(1,3-dioxolane), poly(1,4-phenylene vinylene), poly(2,6-dimethyl-1A-phenylene oxide), poly(4-hydroxybenzoic acid), poly(4-methyl pentene-1), poly(4-vinylpyridine), polymethylacrylonitrile, polymethylphenylsiloxane, polymethylsilmethylene, polymethylsilsesquioxane, poly(phenyl-silsesquioxane), poly(pyromellitimide-1,4-diphenyl ether), polytetrahydrofuran, polythiophene, poly(trimethylene oxide), polyacrylonitrile, polyether sulfone, polyethylene-co-vinyl acetate, poly(perfluoroethylene propylene), poly(perfluoroalkoxyl alkane), or poly(styrene-acrylonitrile).

By "crosslinking agent" is meant a compound carrying at least two reactive functional groups capable of crosslinking a monomer or a polymer, or a mixture of monomers or polymers, during its polymerization.

The crosslinking agent may be chosen from molecules bearing at least two functional groups selected from the group consisting of acrylate, methacrylate, vinyl ether, N-vinyl ether, mercaptoester, thiolene, siloxane, epoxy, oxetane, urethane, isocyanate and peroxide functions.

As crosslinking agent may be mentioned, in particular:
diacrylates, such as 1,6-hexanediol diacrylate, 1,6-hexanediol dimethacrylate, polyethylene glycol dimethacrylate, 1,9-nonanediol dimethacrylate, 1,4-butanediol dimethacrylate, 2,2-bis(4)-méthacryloxyphényl) propane, 1,3-butanediol dimethacrylate, 1,10-decanediol dimethacrylate, bis(2-methacryloxyethyl)N,N'-1, 9-nonylene biscarbamate, 1,4-butanediol diacrylate, ethylene glycol diacrylate 1,5-pentanediol dimethacrylate, 1,4-phenylene diacrylate, allyl methacrylate, N,N'-methylenebisacrylamide, 2,2-bis[4-(2-hydroxy-3-methacryloxypropoxy) phenyl] propane, tetraethylene glycol diacrylate, ethylene glycol dimethacrylate, diethylene glycol diacrylate, triethylene glycol diacrylate, triethylene glycol dimethacrylate, polyethylene glycol diglycidyl ether, N,N-diallylacrylamide, 2,2-bis [4-(2-acryloxyethoxy) phenyl] propane, glycidyl methacrylate;
multifunctional acrylates such as dipentaerythritol pentaacrylate, 1,1,1-trimethylolpropane triacrylate, 1,1,1-trimethylolpropane trimethacrylate, ethylenediamine tetramethacrylate, pentaerythritol triacrylate, pentaerythritol tetraacrylate;
acrylates which also have another reactive function, such as propargyl methacrylate, 2-cyanoethyl acrylate, tricyclodecane dimethanol diacrylate, hydroxypropyl methacrylate, N-acryloxysuccinimide, N-(2-hydroxypropyl) methacrylamide, N-(3-aminopropyl) methacrylamide hydrochloride, N-(t-BOC-aminopropyl) methacrylamide, 2-aminoethyl methacrylate hydrochloride, monoacryloxyethyl phosphate, o-nitrobenzyl methacrylate, acrylic anhydride, 2-(tert-butylamino) ethyl methacrylate, N,N-diallylacrylamide, glycidyl methacrylate, 2-hydroxyethyl acrylate, 4-(2-acryloxyaheoxy)-2-hydroxybenzophenone, N-(phthalimidomethyl) acrylamide, cinnamyl methacrylate.

By "photoinitiator" is meant a compound capable of fragmenting under the effect of light radiation.

The photoinitiators which may be used according to the present invention are known in the art and are described, for example in "Photoinitiators in the crosslinking of coatings", G. Li Bassi, Double Liaison—Chemistry of Paints, No. 361, November 1985, p. 34-41; "Industrial applications of photoinduced polymerization", Henri Strub, L'Actualité Chimique, February 2000, p. 5-13; and "Photopolymers: Theoretical Considerations and Catch Response", Marc, J. M. Abadie, Double Liaison—Paint Chemistry, No. 435-436, 1992, p. 28-34.

These photoinitiators include:
α-hydroxyketones, such as 2-hydroxy-2-methyl-1-phenyl-1-propanone, sold for example under the names DAROCUR® 1173 and 4265, IRGACURE® 184, 2959, and 500 by the company BASF, and ADDITOL® CPK by CYTEC;
α-aminoketones, in particular 2-benzyl-2-dimethyl-amino-1-(4-morpholinophenyl)-butanone-1, sold, for example, under the names Irgacure® 907 and 369 by the company BASF;
aromatic ketones marketed for example under the name ESACURE® TZT by LAMBERTI; or the thioxanthones marketed for example under the name ESACURE® ITX by LAMBERTI, and quinones. These aromatic ketones most often require the presence of a hydrogen donor compound such as tertiary amines and especially alkanolamines. It is possible to mention the tertiary amine ESACURE® EDB sold by the company LAMBERTI.
the α-dicarbonyl derivatives, the most common representative of which is benzyldimethylketal, marketed under the name IRGACURE® 651 by BASF. Other commercial products are marketed by LAMBERTI under the name ESACURE® KB1, and
acylphosphine oxides, such as, for example, bis-acylphosphine oxides (BAPO) marketed for example under the names Irgacure® 819, 1700, and 1800, DAROCUR® 4265, LUCIRIN® TPO, and LUCIRIN® TPO-L by the company BASF.

Among photoinitiators, mention may also be made of aromatic ketones such as benzophenone, phenylglyoxylates, such as the methyl ester of phenylglyoxylic acid, oxime esters, such as [1-(4-phenylsulfanylbenzoyl) heptylideneamino] benzoate, sulphonium salts, iodonium salts and oxime sulphonates.

According to one embodiment, the composition C2 may further comprise an additional monomer or polymer capable of improving the properties of the microcapsule envelope and/or of giving new properties to the microcapsule casing.

Among these additional monomers or polymers may be mentioned monomers or polymers bearing a group sensitive to pH, temperature, UV or IR.

These additional monomers or polymers can induce the rupture of the solid microcapsules and subsequently the release of their contents after stimulation via pH, temperature, UV or IR.

These additional monomers or polymers may be chosen from monomers or polymers bearing at least one reactive functional group chosen from the group consisting of acrylate, methacrylate, vinyl ether, N-vinyl ether, mercaptoester, thiolene, siloxane, epoxy, oxetane, urethane, isocyanate and peroxide functions, and also bearing one of the following groups:
- a hydrophobic group such as a fluorinated group, for example trifluoroethyl methacrylate, trifluoroethyl acrylate, tetrafluoropropyl methacrylate, pentafluoropropyl acrylate, hexafluorobutyl acrylate, or fluorophenyl isocyanate;
- a group sensitive to pH such as primary, secondary or tertiary amines, carboxylic acids, phosphate, sulfate, nitrate or carbonate groups;
- a UV-sensitive or UV-cleavable group (or photochromic group) such as azobenzene, spiropyran, 2-diazo-1,2-naphthoquinone, o-nitrobenzyl, thiol, or 6-nitro-veratroyloxycarbonyl, for example polyethylene oxide)-block-poly(2-nitrobenzylmethacrylate), and other block copolymers, as described in particular in Liu et al., Polymer Chemistry 2013, 4, 3431-3443;
- an IR-sensitive or IR-cleavable group such as o-nitrobenzyl or 2-diazo-1,2-naphthoquinone, for example the polymers described in Liu et al., Polymer Chemistry 2013, 4, 3431-3443; and
- a temperature-sensitive group such as poly(N-isopropylacrylamide).

Step c)

Step c) of the method according to the invention consists in preparing a second emulsion (E2).

The second emulsion consists of a dispersion of droplets of the first emulsion in a composition C3 immiscible with C2, created by dropwise addition of the first emulsion in C3 under stirring.

As indicated above, to obtain capsules containing a single particle (when the composition C1 is a composition C1a), the preparation of the second emulsion is carried out at a temperature above $T_m$. To obtain capsules containing several particles (when the composition C1 is a composition C1b), the preparation of the second emulsion is carried out at a temperature below $T_m$.

Under the conditions of addition of step c), the compositions C2 and C3 are not miscible with each other, which means that the amount (by weight) of the composition C2 capable of being solubilized in the composition C3 is less than or equal to 5%, preferably less than 1%, and preferably less than 0.5%, relative to the total weight of composition C3, and that the amount (by weight) of the composition C3 capable of being solubilized in composition C2 is less than or equal to 5%, preferably less than 1%, and preferably less than 0.5%, relative to the total weight of composition C2.

Thus, when the emulsion (E1) comes into contact with the composition C3 under stirring, the latter is dispersed in the form of drops, called double drops, the dispersion of these emulsion drops (E1) in the continuous phase C3 being called emulsion (E2).

Typically, a double drop formed during step c) corresponds to a single drop of composition C1 as described above, surrounded by a composition envelope C2, which completely encapsulates said single drop.

The double drop formed during step c) may also comprise at least two single drops of composition C1, said single drops being surrounded by a composition envelope C2 which completely encapsulates said single drops.

Thus, said double drops comprise a core consisting of one or more single drops of composition C1, and a layer of composition C2 surrounding said core.

The resulting emulsion (E2) is generally a double polydisperse emulsion (C1-in-C2-in-C3 emulsion or C1/C2/C3 emulsion), which means that the double drops do not have a clear size distribution in the emulsion (E2).

The immiscibility between the compositions C2 and C3 makes it possible to avoid mixing between the layer of composition C2 and the composition C3 and thus ensures the stability of the emulsion (E2).

The immiscibility between the compositions C2 and C3 also makes it possible to prevent the volatile compound of the composition C1 from migrating from the core of the drops to the composition C3.

To implement step c), it is possible to use any type of stirrer usually used to form emulsions, such as, for example, a mechanical stirrer, a static emulsifier, an ultrasonic homogenizer, a membrane homogenizer, a high pressure homogenizer, a colloid mill, a high shear disperser or a high speed homogenizer.

Composition C3

According to one embodiment, the viscosity of the composition C3 at 25° C. is higher than the viscosity of the emulsion (E1) at 25° C.

According to the invention, the viscosity of the composition C3 at 25° C. is between 500 mPa·s and 100,000 mPa·s.

Preferably, the viscosity of the composition C3 at 25° C. is between 3000 mPa·s and 100 000 mPa·s, preferably between 5000 mPa·s and 80,000 mPa·s, for example between 7000 mPa·s and 70,000 mPa·s.

According to this embodiment, given the very high viscosity of the continuous phase formed by the composition C3, the destabilization rate of the double drops of the emulsion (E2) is significantly slow compared to the duration of the method of the invention, which then provides kinetic stabilization of the emulsions (E2) and then (E3) until the polymerization of the capsule envelope is completed. The capsules once polymerized are thermodynamically stable.

Thus, the very high viscosity of the composition C3 ensures the stability of the emulsion (E2) obtained at the end of step b).

A high viscosity of the system advantageously ensures the kinetic stability of the double emulsion (E2), preventing it from being out of phase for the duration of the manufacturing method.

Preferably, the interfacial tension between compositions C2 and C3 is low. The low interfacial tension between the compositions C2 and C3 also advantageously makes it possible to ensure the stability of the emulsion (E2) obtained at the end of step c).

The volume fraction of the first emulsion (E1) in C3 may be varied from 0.05 to 0.5 in order, on the one hand, to improve the production yield and, on the other hand, to vary the mean diameter of the capsules. At the end of this step, the size distribution of the second emulsion is relatively wide.

According to one embodiment, the ratio between the emulsion volume (E1) and the composition volume C3 varies between 1:10 and 10:1. Preferably, this ratio is between 1:9 and 3:1, preferably between 1:9 and 1:1.

According to one embodiment, the composition C3 may further comprise at least one gelling agent as described above.

According to one embodiment, the composition C3 further comprises at least one branched polymer, preferably with a molecular weight greater than 5000 g/mol, and/or at least one polymer with a molecular weight greater than 5000 g/mol$^{-1}$, and/or solid particles such as silicates.

According to one embodiment, the composition C3 comprises at least one plugged polymer that may be used as a gelling agent, preferably with a molecular weight greater than 5000 g/mol, preferably between 10,000 g/mol and 500,000 g/mol$^{-1}$, for example between 50,000 g/mol$^{-1}$ and 300,000 g/mol$^{-1}$.

By "branched polymer" is meant a polymer having at least one branch point between its two end groups, a branch point being a point of a chain on which is fixed a side chain also called a branch or hanging chain.

Among branched polymers may be mentioned, for example, graft polymers, comb, or star polymers or dendrimers.

According to one embodiment, the composition C3 comprises at least one polymer with a molecular weight greater than 5000 g/mol, preferably between 10,000 g/mol and 500,000 g/mol, for example between 50,000 g/mol$^{-1}$ and 300 000 g/mol$^{-1}$, and is usable as a gelling agent.

As a polymer that may be used as a gelling agent, mention may be made of the following compounds, used alone or mixed together:
- cellulose derivatives, such as cellulose ethers: methyl cellulose, ethyl cellulose, hydroxyethyl cellulose, methyl hydroxyethyl cellulose, ethylhydroxyethyl cellulose, carboxymethyl cellulose, hydroxypropyl cellulose or methylhydroxypropyl cellulose;
- polyacrylates (also called carbomers), such as polyacrylic acid (PAA), polymethacrylic acid (PMAA), poly(hydroxyethyl methacrylate) (pHEMA), poly(N-2-hydroxypropyl methacrylate) (pHPMA);
- polyacrylamides such as poly(N-isopropylacrylamide) (PNIPAM);
- polyvinylpyrrolidone (PVP) and its derivatives;
- polyvinyl alcohol (PVA) and its derivatives;
- poly(ethylene glycol), poly(propylene glycol) and their derivatives, such as poly(ethylene glycol) acrylate/methacrylate, poly(ethylene glycol) diacrylate/dimethacrylate, polypropylene carbonate;
- polysaccharides such as carrageenans, carob gum or tara gums, dextran, xanthan gums, chitosan, agarose, hyaluronic acids, gellan gum, guar gum, gum arabic, gum tragacanth, gum diutane, oat gum, karaya gum, ghatti gum, curdlan gum, pectin, konjac gum, starch;
- protein derivatives such as gelatin, collagen, fibrin, polylysine, albumin, casein;
- silicone derivatives such as polydimethylsiloxane (also called dimethicone), alkyl silicones, aryl silicones, alkyl aryl silicones, polyethylene glycol dimethicones, polypropylene glycol dimethicone;
- waxes, such as diester waxes (alkanediol diesters, hydroxyl acid diesters), triester waxes (triacylglycerols, triesters of alkane-1,2-diol, ω-hydroxy acid and fatty acid, esters of hydroxymalonic acid, fatty acid and alcohol, triesters of hydroxyl acids, fatty acid and fatty alcohol, triesters of fatty acid, hydroxyl acid and diol) and polyester waxes (polyesters of fatty acids). The fatty acid esters which may be used as waxes in the context of the invention are, for example, cetyl palmitate, cetyl octanoate, cetyl laurate, cetyl lactate, cetyl isononanoate and stearate. cetyl, stearyl stearate, myristyl stearate, cetyl myristate, isocetyl stearate, glyceryl trimyristate, glyceryl tripalmitate, glyceryl monostearate, or cetyl glyceryl palmitate;
- fatty acids that may be used as waxes include cerotic acid, palmitic acid, stearic acid, dihydroxystearic acid, behenic acid, lignoceric acid, arachidic acid, myristic acid, lauric acid, tridecyclic acid, pentadecyclic acid, margaric acid, nonadecyclic acid, henicosylic acid, tricosylic acid, pentacosylic acid, heptacosylic acid, montanic acid or nonacosylic acid;
- fatty acid salts, in particular fatty acid aluminum salts, such as aluminum stearate, hydroxyl aluminum bis (2-ethylhexanoate);
- isomeric jojoba oil;
- hydrogenated sunflower oil;
- hydrogenated coconut oil;
- hydrogenated lanolin oil; castor oil and its derivatives, especially modified hydrogenated castor oil or compounds obtained by esterification of castor oil with fatty alcohols;
- polyurethanes and their derivatives;
- styrenic polymers such as styrene butadiene; polyolefins such as polyisobutene.

According to one embodiment, the composition C3 comprises solid particles such as clays, silicas and silicates that may be used as gelling agents.

As solid particles that may be used as a gelling agent, mention may be made of clays and silicates belonging, in particular, to the category of phyllosilicates (also known as layered silicas). By way of example of a silicate that may be used in the context of the invention, mention may be made of Bentonite, Hectorite, Attapulgite, Sepiolite, Montmorillonite, Saponite, Sauconite, Nontronite, Kaolinite, Talc, Sepiolite, Chalk. Fumed synthetic silicas may also be used. The clays, silicates and silicas mentioned above may advantageously be modified by organic molecules such as polyethers, ethoxylated amides, quaternary ammonium salts, long-chain diamines, long-chain esters, polyethylene glycols, polypropylene glycols.

These particles may be used alone or mixed together.

According to one embodiment, the composition C3 comprises at least one polymer with a molecular weight greater than 5000 g/mol and solid particles. Any mixture of the compounds mentioned above may be used.

Step d)

Step d) of the method according to the invention consists in refining the size of the drops of the second emulsion (E2).

To obtain capsules containing a single particle (when the composition C1 is a composition C1a), the refining in size is carried out at a temperature above $T_m$. The second monodisperse emulsion is then allowed to cool below to a lower temperature $T_m$.

To obtain capsules containing several particles (when the composition C1 is a composition C1b), the size refining is carried out at a temperature below $T_m$.

Step d) may consist in applying a homogeneous controlled shear to the emulsion (E2), said applied shear rate being between 10 s$^{-1}$ and 100,000 s$^{-1}$.

According to one embodiment, the double polydisperse drops obtained in step c) are subjected to a size refinement consisting of shearing them to break them into new double drops of homogeneous and controlled diameters. Preferably, this fragmentation step is carried out using a Couette type high-shear cell according to a method described in patent application EP 15 306 428.2.

According to one embodiment, in step d), the second emulsion (E2), obtained at the end of step c), consisting of polydisperse double droplets dispersed in a continuous phase, is subjected to shear in a mixer, which applies a homogeneous controlled shear.

Thus, according to this embodiment, step d) consists in applying a homogeneous controlled shear to the emulsion (E2), said applied shear rate being between 1000 s$^{-1}$ and 100,000 s$^{-1}$.

According to this embodiment, in a mixer, the shear rate is said to be controlled and homogeneous, regardless of the duration, when it passes to an identical maximum value for all parts of the emulsion, at a given instant that may vary from one point of the emulsion to another. The exact configuration of the mixer is not essential according to the invention, as long as the entire emulsion is subjected to the same maximum shear rate of this device. Mixers adapted to perform step d) are described, in particular, in U.S. Pat. No. 5,938,581.

The second emulsion may undergo homogeneous controlled shear as it flows through a cell formed by:
two concentric rotary cylinders (also called Couette type mixer);
two parallel rotating discs; or
two parallel oscillating plates.

According to this embodiment, the shear rate applied to the second emulsion is between 1000 s$^{-1}$ and 100,000 s$^{-1}$, preferably between 1000 s$^{-1}$ and 50,000 s$^{-1}$, and preferably between 2000 s$^{-1}$ and 20,000 s$^{-1}$.

According to this embodiment, during step d), the second emulsion is introduced into the mixer and is then subjected to shear resulting in the formation of the third emulsion. The third emulsion (E3) is chemically identical to the second emulsion (E2) but consists of monodisperse double drops while the emulsion (E2) consists of double polydisperse drops. The third emulsion (E3) typically consists of a dispersion of double drops comprising a core consisting of one or more drops of composition C1 and a layer of composition C2 encapsulating said core, said double drops being dispersed in composition C3.

The difference between the second emulsion and the third emulsion is the size variance of the double drops: whereby the drops of the second emulsion are polydisperse in size while the drops of the third emulsion are monodisperse, thanks to the fragmentation mechanism described above.

Preferably, according to this embodiment, the second emulsion is introduced continuously into the mixer, which means that the quantity of double emulsion (E2) introduced at the mixer inlet is the same as the quantity of third emulsion (E3) at the mixer outlet.

Since the size of the drops of the emulsion (E3) corresponds essentially to the size of the drops of the solid microcapsules after polymerization, it is possible to adjust the size of the microcapsules and the thickness of the envelope by adjusting the shear rate during step d), with a strong correlation between decrease in drop size and increase in shear rate. This makes it possible to adjust the resulting dimensions of the microcapsules by varying the shear rate applied during step d).

According to a preferred embodiment, the mixer implemented during step d) is a Couette type mixer, comprising two concentric cylinders, an outer cylinder of inner radius $R_o$ and an inner cylinder of outer radius $R_i$, the outer cylinder being fixed and the inner cylinder being rotated with an angular velocity ω.

A Couette type mixer adapted for the method of the invention may be provided by T.S.R. France.

According to one embodiment, the angular velocity ω of the internal rotating cylinder of the Couette type mixer is greater than or equal to 30 rad·s$^{-1}$.

For example, the angular velocity ω of the inner rotating cylinder of the Couette type mixer is about 70 rad·s$^{-1}$.

The dimensions of the fixed outer cylinder of the Couette type mixer may be chosen to modulate the space (d=$R_o$-$R_i$) between the rotating inner cylinder and the fixed outer cylinder.

According to one embodiment, the space (d=$R_o$-$R_i$) between the two concentric cylinders of the Couette type mixer is between 50 μm and 1000 μm, preferably between 100 μm and 500 μm, for example between 200 μm. and 400 μm.

For example, the distance d between the two concentric cylinders is equal to 100 μm.

According to this embodiment, during step d), the second emulsion is introduced at the inlet of the mixer, typically via a pump, and is directed towards the space between the two concentric cylinders, the outer cylinder being fixed and the inner cylinder being rotated at an angular velocity ω.

When the double emulsion is in the space between the two cylinders, the shear rate applied to said emulsion is given by the following equation:

$$\gamma = \frac{R_i \omega}{(R_o - R_i)}$$

wherein:
ω is the angular velocity of the rotating internal cylinder,
$R_o$ is the inner radius of the fixed outer cylinder, and
$R_i$ is the outer radius of the inner cylinder in rotation.

According to another embodiment, when the viscosity of the composition C3 is greater than 2000 mPa·s at 25° C., the step d) consists in applying to the emulsion (E2) a shear rate of less than 1000 s$^{-1}$.

According to this embodiment, the fragmentation step d) may be carried out using any type of mixer usually used to form emulsions with a shear rate of less than 1000 s$^{-1}$, in which case the viscosity of the composition C3 is greater than 2000 mPa·s, namely under conditions such as those described in the patent application FR 16 61787.

The geometric characteristics of the double drops formed at the end of this stage will dictate those of the future capsules.

According to this embodiment, in step d), the emulsion (E2), consisting of polydisperse drops dispersed in a continuous phase, is subjected to shearing, for example in a mixer, at a low shear rate, at less than 1,000 s$^{-1}$.

According to this embodiment, the shear rate applied in step d) is for example between 10 s-1 and 1000 s$^{-1}$.

Preferably, the shear rate applied in step d) is strictly less than 1000 s$^{-1}$.

According to this embodiment, the emulsion drops (E2) may only be efficiently fragmented into fine and monodisperse emulsion drops (E3) if a high shear stress is applied thereto.

The shear stress σ applied to a drop of emulsion (E2) is defined as the tangential force per unit area of drop resulting from the macroscopic shear applied to the emulsion during its stirring during step d).

The shear stress σ (expressed in Pa), the viscosity of the composition C3 η (expressed in Pa s) and the shear rate γ (expressed in s$^{-1}$) applied to the emulsion (E2) during its stirring during step d) are connected by the following equation:

σ=ηγ

Thus, according to this embodiment, the high viscosity of the composition C3 makes it possible to apply a very high shear stress to the emulsion drops (E2) in the mixer, even if the shear rate is low and the shear inhomogeneous.

To implement step d) according to this embodiment, it is possible to use any type of stirrer usually used to form emulsions, such as, for example, a mechanical stirrer, a static emulsifier, an ultrasonic homogenizer, a homogenizer membrane, a high pressure homogenizer, a colloid mill, a high shear disperser or a high speed homogenizer.

According to a preferred embodiment, a single emulsifier such as a mechanical stirrer with blades or a static emulsifier is used to implement step d). In fact, this is possible because this embodiment requires neither controlled shear nor shear greater than 1,000 s$^{-1}$.

Step e)

Step e) of the method of the invention consists of the crosslinking and therefore the formation of the envelope of the solid microcapsules according to the invention.

This step makes it possible both to achieve the expected performance of protection and retention of the capsules and to ensure their thermodynamic stability, permanently preventing any destabilizing mechanism such as coalescence or hardening.

According to one embodiment, when the composition C2 comprises a photoinitiator, step e) is a photopolymerization step of exposing the emulsion (E3) to a light source capable of initiating the photopolymerization of the composition C2, in particular to a UV light source emitting preferably in the wavelength range of between 100 nm and 400 nm, and, in particular, for a duration of less than 15 minutes.

According to this embodiment, step e) consists of subjecting the emulsion (E3) to photopolymerization, which will allow the photopolymerization of the composition C2. This step will make it possible to obtain microcapsules encapsulating the volatile compound as defined above.

According to one embodiment, step e) consists in exposing the emulsion (E3) to a light source capable of initiating the photopolymerization of the composition C2.

Preferably, the light source is a source of UV light.

According to one embodiment, the UV light source emits in the wavelength range of between 100 nm and 400 nm.

According to one embodiment, the emulsion (E3) is exposed to a light source for less than 15 minutes, and preferably during 5 to 10 minutes.

During step e), the envelope of the aforementioned double drops, consisting of photocurable composition C2, is crosslinked and thus converted into a viscoelastic polymeric envelope, encapsulating and protecting the volatile compound(s) from release in the absence of a mechanical trigger.

According to another embodiment, when the composition C2 does not comprise a photoinitiator, step e) is a polymerization step, without exposure to a light source, the duration of this polymerization step e) being preferably between 8 hours and 100 hours and/or this step e) being carried out at a temperature between 20° C. and 80° C.

According to this embodiment, the polymerization is initiated, for example, by exposure to heat (thermal initiation), or simply by contacting the monomers, polymers and crosslinking agents with each other, or with a catalyst. The polymerization time is then generally greater than several hours.

Preferably, the polymerization step e) of the composition C2 is carried out for a period of between 8 hours and 100 hours at a temperature of between 20° C. and 80° C.

The composition obtained at the end of step e), comprising solid microcapsules dispersed in the composition C3, is ready for use and may be used without any additional step of post-treatment of the capsules being required.

The thickness of the envelope of the microcapsules thus obtained is typically between 0.1 µm and 20 µm, preferably between 0.2 µm and 10 µm, preferably between 0.2 µm and 8 µm.

According to one embodiment, the solid microcapsules obtained at the end of step e) are devoid of surfactant at the interface between the solid shell and the external medium (or continuous phase), in particular represented by the composition C3.

The method of the invention has the advantage of not requiring a surfactant, in any of steps b) to e) of formation of the envelope of the solid microcapsules. The method of the invention thus makes it possible to reduce the presence of additives which could modify the properties of the final product obtained after the release of the volatile compound.

The present invention also relates to a series (or set) of solid microcapsules, obtainable by the method as defined above, in which each microcapsule comprises:
  a core comprising a composition C1 as defined above, and
  a solid envelope encapsulating completely at its periphery the core, whereby the average diameter of said microcapsules is between 1 µm and 30 µm, the thickness of the rigid envelope is between 0.1 µm and 20 µm, and the standard deviation of the microcapsule diameter distribution is less than 50%, in particular less than 25%, or less than 1 µm.

As indicated above, the method of the invention makes it possible to obtain monodisperse particles. Also, the series of solid microcapsules mentioned above is formed by a population of monodisperse particles in size. Thus, the standard deviation of the diameter distribution of the microcapsules is less than 50%, in particular less than 25%, or less than 1 µm.

The size distribution of the solid microcapsules may be measured by light scattering technique using a Mastersizer 3000 (Malvern Instruments) equipped with a Hydro SV cell.

According to one embodiment, the aforementioned solid microcapsules comprise a solid envelope entirely composed of crosslinked polymer (obtained from composition C2).

As indicated above, the method of the invention makes it possible to obtain solid microcapsules. The present invention therefore also relates to solid microcapsules comprising a core and a rigid envelope completely encapsulating at its periphery the core, the core being a composition C1 and said rigid envelope being made of crosslinked polymer, the diameter of said capsule being between 1 µm and 30 µm and the thickness of the rigid envelope being between 0.1 µm and 20 µm, and whereby the composition C1 is:
  either a composition C1a comprising a single hydrophobic solid particle,
  or a composition C1b comprising a plurality of hydrophobic solid particles dispersed in a hydrophilic phase,
  said hydrophobic solid particles containing one or more lipophilic volatile compounds and one or more hydrophobic materials, solid at room temperature and liquid at a temperature above $T_m$, $T_m$, being between 30° C. and 80° C.

The present invention also relates to a composition comprising a series of solid microcapsules as defined above.

According to an alternative embodiment, the composition comprises at least one double population of solid microcapsules according to the invention which differ from each other at least in the composition C1, in particular at the level of the perfuming agent. This embodiment is advantageous in that it makes it possible, in particular, to stably and efficiently encapsulate incompatible volatile compounds when present within the same solution.

The capsules of the invention may advantageously be used to protect the active ingredients used in the polymer, elastomer, rubber, paint, adhesive, seal, mortar, paper, varnish or coating; in synthetic chemistry products; laundry, detergent, laundry and home care products; in agrochemicals such as fertilizers, herbicides, insecticides, fungicides or pesticides; textiles; petrochemicals such as lubricants, fuels, bitumens, drilling fluids and well stimulation.

The present invention also relates to a method for releasing a volatile compound, comprising a step of applying a mechanical shear stress to a composition comprising a series of solid microcapsules as defined above.

The expressions "between . . . and . . . ", "from . . . to . . . " and "going from . . . to . . . " must be understood as being inclusive, unless otherwise specified.

The following examples illustrate the present invention without limiting its scope.

EXAMPLES

Example 1: Manufacture of Solid Capsules According to the Invention

A mechanical stirrer (Ika Eurostar 20) equipped with a deflocculating stirring propeller is used to carry out all the stirring steps.

Step a): Creation of the Core of the Capsules (Dispersion of Particles—Composition C1b)

|  |  | Weight (g) | % |
|---|---|---|---|
| Composition C1a | Solvesso 200 ND | 14 | 40 |
|  | Saturated triglyceride wax (Suppocire DM wax, Gattefossé) | 6 | 17.1 |
| Composition B | Dispersant (Tween 80, Sigma Aldrich) | 2 | 5.7 |
|  | Deionized water | 13 | 37.2 |
|  | Total | 35 | 100 |

The composition C1a is placed in a bath thermostated at 35° C. and stirred at 500 rpm until complete dissolution of the wax. Composition B is placed in a bath thermostated at 35° C. and stirred at 200 rpm until complete homogenization. The composition C1a is then added to the composition B dropwise under stirring at 2000 rpm, still at 35° C. The mixture is stirred at 2000 rpm for 5 minutes and then sonicated (Vibra-cell 75042, Sonics) for 20 minutes (pulse 5 s/2 s) at 30% amplitude. If the temperature exceeds 35° C. during sonication, the mixture is cooled by ice.

After cooling, 1.05 g of modified polyethylene glycol gelling agent (Aculyn 44N, Dow) is added to the mixture under stirring at 500 rpm until gelation. The composition C1b is thus obtained.

Step b): Preparation of the First Emulsion (E1)

|  | Components | Weight (g) | % Total |
|---|---|---|---|
| Composition C1b |  | 3 | 30 |
| Composition C2 |  | 7 | 70 |
|  | CN981 (urethane acrylate oligomer, Sartomer) | 6.09 |  |
|  | HDDA (hexane-1,6-diol diacrylate, Sartomer) | 0.7 |  |
|  | Darocur 1173 (photoinitiateur, BASF) | 0.21 |  |
|  | Total | 10 | 100 |

The composition C1 is added dropwise to the composition C2 under stirring at 2000 rpm, at a temperature $T_b=20°$ C. The first emulsion (E1) is thus obtained.

Step c): Preparation of the Second Emulsion (E2)

|  |  | Weight (g) | % total |
|---|---|---|---|
| First emulsion (E1) |  | 5 | 5 |
| Composition C3 | Modified polyethylene glycol gelling agent (Aculyn 44N, Dow) | 2.85 | 2.85 |
|  | Deionized water | 92.15 | 92.15 |
|  | Total | 100 | 100 |

The composition C3 is stirred at 1000 rpm until complete homogenization. The first emulsion (E1) is then added dropwise to the composition C3 under stirring at 1200 rpm, at a temperature $T_c=20°$ C. This gives the second emulsion (E2).

Step d): Refining in Size of the Second Emulsion

The second polydisperse emulsion obtained in the preceding step is stirred at 1200 rpm for 10 minutes, at a temperature $T_d=20°$ C. A monodisperse emulsion (E3) is thus obtained.

Step e): Reticulation of the Capsule Envelope

The second monodisperse emulsion (E3) obtained in the previous step is irradiated for 15 minutes with the aid of a UV light source (Dymax LightBox ECE 2000) having a maximum light intensity of 0.1 W/cm$^2$ at a waveform length of 365 nm.

The solid microcapsules according to Example 1 have a good size distribution, namely an average size of 2.4 μm and a standard deviation of 1.1 μm, or 46%. Moreover, the quality of encapsulation of the volatile lipophilic compound, namely the organic solvent, with the microcapsules according to Example 1 was monitored for 30 days at room temperature.

There is no change in color or smell emanation, especially the encapsulated organic solvent, even after stirring. There is also no phase separation in the suspension of capsules, indicating the absence of leakage of the organic solvent, immiscible with the composition C3.

The solid microcapsules according to Example 1 thus prove to be particularly suitable for effectively encapsulating a volatile lipophilic compound, in particular an organic solvent.

Example 2: Manufacture of Solid Capsules According to the Invention

A mechanical stirrer (Ika Eurostar 20) equipped with a deflocculating stirring propeller is used to carry out all the stirring steps.

Step a): Creation of the Core of the Capsules (Dispersion of Particles—Composition C1b)

|  |  | Weight (g) | % |
|---|---|---|---|
| Composition C1a | Beta-ionone (4-(2,6,6-Trimethyl-1-cyclohexenyl)-3-buten-2-one, Sigma Aldrich) | 2 | 40 |
|  | Saturated triglyceride wax (Suppocire DM wax, Gattefossé) | 8 | 10 |
| Composition B | Dispersant (Tween 80, Sigma Aldrich) | 0.8 | 4 |
|  | Deionized water | 9.2 | 46 |
|  | Total | 20 | 100 |

The composition C1a is placed in a bath thermostated at 35° C. and stirred at 500 rpm until complete dissolution of the wax. Composition B is placed in a bath thermostated at 35° C. and stirred at 200 rpm until complete homogenization. The composition C1a is then added to the composition B dropwise under stirring at 2000 rpm still at 35° C. It is then subjected to high agitation using an emulsification rod for 5 minutes (19G, Ultra-Turrax®, IKA) and sonication for 3 minutes (Vibra-cell 75042, Sonics, pulse 5 s/2 s) at 30% amplitude. If the temperature exceeds 35° C. during sonication, the mixture is cooled by ice.

After cooling, 0.4 g of modified polyethylene glycol (Aculyn 44N, Dow) are added to the mixture under stirring at 500 rpm until gelation. The composition C1b is thus obtained.

Step b): Preparation of the First Emulsion (E1)

|  | Components | Weight (g) | % Total |
|---|---|---|---|
| Composition C1b |  | 3 | 30 |
| Composition C2 | CN2035 (Polyester acrylate oligomer, Sartomer) | 6.65 | 70 |
|  | Hexanediol diacrylate (Sigma-Aldrich) | 0.14 |  |
|  | Darocur 1173 (photoinitiator, BASF) | 0.21 |  |
|  | Total | 10 | 100 |

The composition C1 is added dropwise to the composition C2 under stirring at 2000 rpm, at a temperature $T_b$=20° C. The first emulsion (E1) is thus obtained.

Step c): Preparation of the Second Emulsion (E2)

|  |  | Weight (g) | % total |
|---|---|---|---|
| First emulsion (E1) |  | 5 | 5 |
| Composition C3 | Alginate (Sigma Aldrich) | 9.5 | 95 |
|  | Deionized water | 85.5 |  |
|  | Total | 100 | 100 |

The composition C3 is stirred at 2000 rpm until complete homogenization. The first emulsion (E1) is then added dropwise to the composition C3 under stirring at 2000 rpm for 1 minute, at a temperature $T_c$=20° C. This gives the second emulsion (E2).

Step d): Refining in Size of the Second Emulsion

The second polydisperse emulsion obtained in the preceding step is stirred at 1200 rpm for 10 minutes, at a temperature $T_d$=20° C. A monodisperse emulsion (E3) is thus obtained.

Step e): Reticulation of the Capsule Envelope

The second monodisperse emulsion (E3) obtained in the previous step is irradiated for 15 minutes with the aid of a UV light source (Dymax LightBox ECE 2000) having a maximum light intensity of 0.1 W/cm² at a waveform length of 365 nm.

The solid microcapsules according to Example 2 have a good size distribution, namely an average size of 10 μm and a standard deviation of 3.7 μm or 37%.

Furthermore, the encapsulation quality of the volatile lipophilic compound, namely the beta-ionone, was evaluated by high performance liquid chromatography (HPLC).

The microcapsules were separated from their continuous phase by centrifugation at 2000 rpm for 20 min. The supernatant was then analyzed by HPLC to quantify the amount of beta-ionone present and thus go back to the encapsulation efficiency. An amount of unencapsulated beta-ionone of 0.5%+/−0.2% was determined. Thus, the capsules according to the invention are capable of efficiently retaining 99.5%+/−0.2% of the initially encapsulated beta-ionone.

The solid microcapsules according to Example 2 thus prove to be particularly suitable for effectively encapsulating a volatile lipophilic compound, in particular an odoriferous molecule such as beta-ionone.

The invention claimed is:

1. A method for preparing solid microcapsules comprising the following steps:
   a) preparing a composition C1, which is either a composition C1a, comprising a single hydrophobic solid particle, or a composition C1b comprising a plurality of hydrophobic solid particles dispersed in a hydrophilic phase,
      the hydrophobic solid particle(s) containing one or more lipophilic volatile compounds and one or more hydrophobic materials, said material(s) being solid at room temperature and liquid at a temperature above $T_m$,
   b) adding, under stirring, of the composition C1 in a polymeric composition C2 at a temperature $T_b$, the compositions C1 and C2 being immiscible with one another, the temperature $T_b$ being greater than $T_m$ when the composition C1 is a composition C1a and the temperature $T_b$ being less than $T_m$ when the composition C1 is a composition C1b,
      the composition C2 comprising at least one monomer or polymer and at least one crosslinking agent, and at least one (photo) initiator or crosslinking catalyst,
      the viscosity of the composition C2 being between 500 mPa·s and 100 000 mPa·s at 25° C., and being greater than the viscosity of the composition C1,
      whereby an emulsion (E1) comprising drops of composition C1a or C1b dispersed in composition C2 is obtained;
   c) adding, under stirring, of the emulsion (E1) in a composition C3 at a temperature $T_c$, the compositions C2 and C3 not being miscible with each other, the temperature $T_c$ being greater than $T_m$ when the emulsion (E1) comprises drops of composition C1a dispersed in composition C2 and the temperature $T_c$ being less than $T_m$ when the emulsion (E1) comprises drops of composition C1b dispersed in the composition C2,
      the viscosity of the composition C3 being between 500 mPa·s and 100 000 mPa·s at 25° C., and being greater than the viscosity of the emulsion (E1),
      whereby a double emulsion (E2) comprising drops dispersed in the composition C3 is obtained;
   d) applying shear to the emulsion (E2) at a temperature $T_d$, the temperature $T_d$ being greater than $T_m$ when the composition C1 of step a) is a composition C1a and the temperature $T_d$ being less than $T_m$ when the composition C1 of step a) is a composition C1b,
      whereby a double emulsion (E3) is obtained comprising controlled size drops dispersed in the composition C3; and
   e) polymerizing the composition C2, whereby solid microcapsules dispersed in the composition C3 are obtained.

2. The method according to claim 1, whereby the hydrophobic material(s) is/are chosen from the group consisting of: waxes, butters or pasty fatty substances, and mixtures thereof.

3. The method according to claim 1, whereby the volatile lipophilic compounds are selected from the group consisting of: perfuming agents, flavonoids, unsaturated fatty acids, organic solvents, flame retardants and mixtures thereof.

4. The method according to claim 1, wherein the hydrophilic phase of C1b comprises at least one dispersing agent and at least one gelling agent.

5. The method according to claim 4, wherein the dispersing agent is selected from the group consisting of surfactants; polyacrylates; esters of sugar/polysaccharide and fatty acid(s); polyamides; polyethers and polyesters of silicone; ethoxylated alcohols; and their mixtures.

6. The method according to claim 1, wherein, when the composition C1 is a composition C1a, step a) comprises a step of heating the hydrophobic material or materials to a temperature above $T_m$, followed by a step of adding the lipophilic volatile compound(s), and a step of mixing the whole at a temperature greater than $T_m$.

7. The method according to claim 1, wherein, when the composition C1 is a C1b composition, step a) further comprises a step of dispersing the composition C1a in the hydrophilic phase, followed by a cooling step of the dispersion thus obtained at a temperature below $T_m$, whereby hydrophobic solid particles dispersed in said hydrophilic phase are obtained.

8. The method according to claim 1, wherein step d) consists in applying a homogeneous controlled shear to the emulsion (E2), said shear rate applied being between 1,000 s$^{-1}$ and 100,000 s$^{-1}$.

9. The method according to claim 1, wherein, when the viscosity of the composition C3 is greater than 2000 mPa·s at 25° C., step d) consists in applying to the emulsion (E2) a shear rate of less than 1000 s$^{-1}$.

10. The method according to claim 1, wherein, when the composition C2 comprises a photoinitiator, step e) is a photopolymerization step of exposing the emulsion (E3) to a source of light capable of initiating the photopolymerization of the composition C2.

11. The method according to claim 1, wherein, when the composition C2 does not comprise a photoinitiator, step e) is a polymerization step, without exposure to a light source.

12. A series of solid microcapsules, wherein each microcapsule comprises:
   a core comprising a composition C1 as defined according to claim 1 and
   a solid envelope encapsulating completely at its periphery the core,
      whereby the average diameter of said microcapsules is between 1 μm and 30 μm, the thickness of the rigid envelope is between 0.1 μm and 20 μm and the standard deviation of the microcapsule diameter distribution is less than 50%, or less than 1 μm.

13. A composition comprising a series of solid microcapsules according to claim 12.

14. A method of releasing a volatile compound, comprising a step of applying mechanical shear stress to a composition comprising a series of solid microcapsules according to claim 13.

\* \* \* \* \*